US012682621B2

(12) United States Patent
Malur Srinivasan et al.

(10) Patent No.: US 12,682,621 B2
(45) Date of Patent: Jul. 14, 2026

(54) META-LEARNING MODEL TRAINING BASED ON CAUSAL TRANSPORTABILITY BETWEEN DATASETS

(71) Applicant: FUJITSU LIMITED, Kawasaki (JP)

(72) Inventors: Ramya Malur Srinivasan, San Diego, CA (US); Kanji Uchino, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 1035 days.

(21) Appl. No.: 17/654,824

(22) Filed: Mar. 15, 2022

(65) Prior Publication Data

US 2023/0298325 A1    Sep. 21, 2023

(51) Int. Cl.
| | |
|---|---|
| *G06V 10/774* | (2022.01) |
| *G06F 18/21* | (2023.01) |
| *G06F 18/214* | (2023.01) |
| *G06V 10/772* | (2022.01) |

(52) U.S. Cl.
CPC ........ *G06V 10/7747* (2022.01); *G06F 18/214* (2023.01); *G06F 18/217* (2023.01); *G06V 10/772* (2022.01)

(58) Field of Classification Search
CPC .............. G06V 10/7747; G06V 10/772; G06F 18/214; G06F 18/217; G06N 3/0475; G06N 3/0985
See application file for complete search history.

(56) References Cited

U.S. PATENT DOCUMENTS

| | | | |
|---|---|---|---|
| 2021/0158815 A1* | 5/2021 | Lee ...................... | G06V 10/764 |
| 2021/0334402 A1* | 10/2021 | Detchemendy ....... | H04L 63/108 |
| 2022/0245643 A1* | 8/2022 | Venkatasubramaniam ................... | G06N 3/08 |
| 2022/0400134 A1* | 12/2022 | Chen Kaidi ........... | G06V 30/19 |
| 2023/0269263 A1* | 8/2023 | Yarabolu ............. | G06F 18/2155 726/22 |
| 2024/0233416 A1* | 7/2024 | Zhang .................. | G06V 10/772 |
| 2024/0371481 A1* | 11/2024 | Bhatt ..................... | G16H 50/20 |

OTHER PUBLICATIONS

Fehr et al. (A causal framework for assessing the transportability of clinical prediction models, medRxiv, published Mar. 2, 2022, pp. 1-25). (Year: 2022).*

(Continued)

*Primary Examiner* — Tan H Tran
(74) *Attorney, Agent, or Firm* — Fujitsu Intellectual Property Center

(57) ABSTRACT
In an embodiment, multiple datasets related to multiple application domains are received. Further, feature dependency information associated with a first dataset is determined, based on a first user input. Also, feature difference information associated with the first dataset and a second dataset is determined, based on a second user input and a set of ethical requirements. A set of structural causal models (SCMs) associated with the first dataset are determined based on the feature dependency information and the feature difference information. A set of ethical coefficients associated with the set of ethical requirements are determined based on an application of a causal transportability model on the set of SCMs. A trust score associated with the first dataset is determined based on the set of ethical coefficients. The trust score is used to train a meta-learning model associated with the multiple application domains.

20 Claims, 7 Drawing Sheets

400

Receive plurality of datasets related to plurality of application domains 402

Determine feature dependency information associated with first dataset of received plurality of datasets, based on first user input 404

Determine feature difference information associated with first dataset and second dataset of received plurality of datasets, based on second user input and set of ethical requirements, wherein second dataset is different from first dataset 406

Determine set of structural causal models (SCMs) associated with first dataset based on determined feature dependency information and determined feature difference information 408

Determine set of ethical coefficients associated with set of ethical requirements based on application of causal transportability model on determined set of SCMs 410

Determine trust score associated with first dataset based on determined set of ethical coefficients 412

Train meta-learning model associated with plurality of application domains, based on plurality of trust scores associated with plurality of datasets, wherein plurality of trust scores includes determined trust score associated with first dataset 414

(56)          References Cited

OTHER PUBLICATIONS

Bareinbom Elias, and Judea Pearl. "Causal inference and the data-fusion problem." Proceedings of the National Academy of Sciences 113.27 (2016): 7345-7352.

Bromley J., Guyon, I., LeCun, Y., Säckinger, E., & Shah, R. "Signature verification using a 'siamese' time delay neural network." Advances in neural information processing systems, (1993) 737-744.

Finn Chelsea, Pieter Abbeel, and Sergey Levine. "Model-agnostic meta-learning for fast adaptation of deep networks." International conference on machine learning. PMLR, 2017, arXiv:1703. 03400v3, 13 pages.

Hünemund Paul, and Elias Bareinboim. "Causal inference and data fusion in econometrics." (2021) arXiv:1912.09104v3, 62 pages.

Munkhdalai Tsendsuren, and Hong Yu. "Meta networks." International Conference on Machine Learning. PMLR, 2017, arXiv:1703. 00837v2, 11 pages.

Nichol Alex, Joshua Achiam, and John Schulman. "On first-order meta-learning algorithms." arXiv:1803.02999 (2018). 15 pages.

Ravi Sachin, and Hugo Larochelle. "Optimization as a model for few-shot learning.", published as a conference paper at ICLR 2017, 11 pages.

Santoro Adam, et al. "Meta-learning with memory-augmented neural networks." Proceedings of the 33rd International Conference on Machine Learning, JMLR: W&CP vol. 48, 2016, 9 pages.

Snell Jake, Kevin Swersky, and Richard Zemel. "Prototypical networks for few-shot learning." 31st Conference on Neural Information on Processing Systems (NIPS 2017), 11 pages.

Sung Flood, et al., "Learning to compare: Relation network for few-shot learning." Proceedings of the IEEE conference on computer vision and pattern recognition, 2018, 10 pages.

Vinyals Oriol, et al., "Matching Networks for One Shot Learning.", 30th Conference on Neural Information Processing Systems (NIPS 2016), 9 pages.

Koch Gregory, et al., "Siamese Neural Networks for One-shot Image Recognition.", Proceedings of the 32nd International Conference on Machine Learning, 2015; JMLR: W&CP vol. 37, 8 pages.

Dylan Slack et al: "Fair Meta-Learning: Learning How to Learn Fairly", arxiv.org, Cornell University Library, 201 OLIN Library Cornell University Ithaca, NY 14853, Nov. 6, 2019 (Nov. 6, 2019), XP081530118.

Chen Zhao et al: "Fair Meta-Learning For Few-Shot Classification", arxiv.org, Cornell University Library, 201 OLIN Library Cornell University Ithaca, NY 14853, Sep. 23, 2020 (Sep. 23, 2020), XP081773109.

Ramya Srinivasan et al: "Biases in Generative Art—A Causal Look from the Lens of Art History", 2021 Association for Computer Machinery [ACM] Conference on Fairness, Accountability and Transparency, Virtual Event, Canada, Mar. 3, 2021 (Mar. 3, 2021), pp. 41-51, XP058948332, DOI: 10.1145/3442188.3445869 ISBN: 978-1-4503-9321-8.

Cloudera Fast Forward "Meta Learning" Feb. 2, 2021 (Feb. 2, 2021), pp. 1-32, XP093062104, Retrieved from the Internet: URL:https://web.archive.org/web/20210202213232; /https://meta-learning.fastforwardlabs.com/ [retrieved on Jul. 7, 2023].

European Patent Office, Extended European Search Report [EESR] dated Jul. 17, 2023, in connection with counterpart Application No. 22 20 0823.

* cited by examiner

200

400

Receive plurality of datasets related to plurality of application domains 402

Determine feature dependency information associated with first dataset of received plurality of datasets, based on first user input 404

Determine feature difference information associated with first dataset and second dataset of received plurality of datasets, based on second user input and set of ethical requirements, wherein second dataset is different from first dataset 406

Determine set of structural causal models (SCMs) associated with first dataset based on determined feature dependency information and determined feature difference information 408

Determine set of ethical coefficients associated with set of ethical requirements based on application of causal transportability model on determined set of SCMs 410

Determine trust score associated with first dataset based on determined set of ethical coefficients 412

Train meta-learning model associated with plurality of application domains, based on plurality of trust scores associated with plurality of datasets, wherein plurality of trust scores includes determined trust score associated with first dataset 414

META-LEARNING MODEL TRAINING BASED ON CAUSAL TRANSPORTABILITY BETWEEN DATASETS

FIELD

The embodiments discussed in the present disclosure are related to training of a meta-learning model based on a causal transportability between datasets.

BACKGROUND

Advancements in the field of machine learning and Artificial Intelligent (AI) have led to development of meta-learning models that may be used for various prediction tasks. Typically, such meta-learning models may be trained on one type of prediction task and may be applied on another type of prediction task. For example, a meta-learning model may be trained on a binary classification task to distinguish cat images from dog images, and flower images from bike images. Further, an unrelated dataset may be used to test the meta-learning model. For example, the meta-learning model may be tested on a task to segregate dog images from otter images. However, in certain cases, one or more training datasets may be biased towards one class (for example, the dog class). As an example, the one or more training datasets may include a significant number of dog images, as compared to cat images. In such case, the meta-learning model may become biased in an unethical way. Such biased meta-learning models may produce incorrect outcomes, which may lead to unwanted consequences.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations which may include receiving a plurality of datasets related to a plurality of application domains. The set of operations may further include determining feature dependency information associated with a first dataset of the received plurality of datasets, based on a first user input. The set of operations may further include determining feature difference information associated with the first dataset and a second dataset of the received plurality of datasets, based on a second user input and a set of ethical requirements. Herein, the second dataset may be different from the first dataset. The set of operations may further include determining a set of structural causal models (SCMs) associated with the first dataset based on the determined feature dependency information and the determined feature difference information. The set of operations may further include determining a set of ethical coefficients associated with the set of ethical requirements based on an application of a causal transportability model on the determined set of SCMs. The set of operations may further include determining a trust score associated with the first dataset based on the determined set of ethical coefficients. The set of operations may further include training a meta-learning model associated with the plurality of application domains, based on a plurality of trust scores associated with the plurality of datasets. Herein, the plurality of trust scores may include the determined trust score associated with the first dataset.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 is a diagram that illustrates a flowchart of an example method for training a meta-learning model based on a causal transportability between datasets;

DESCRIPTION OF EMBODIMENTS

Figure 1:
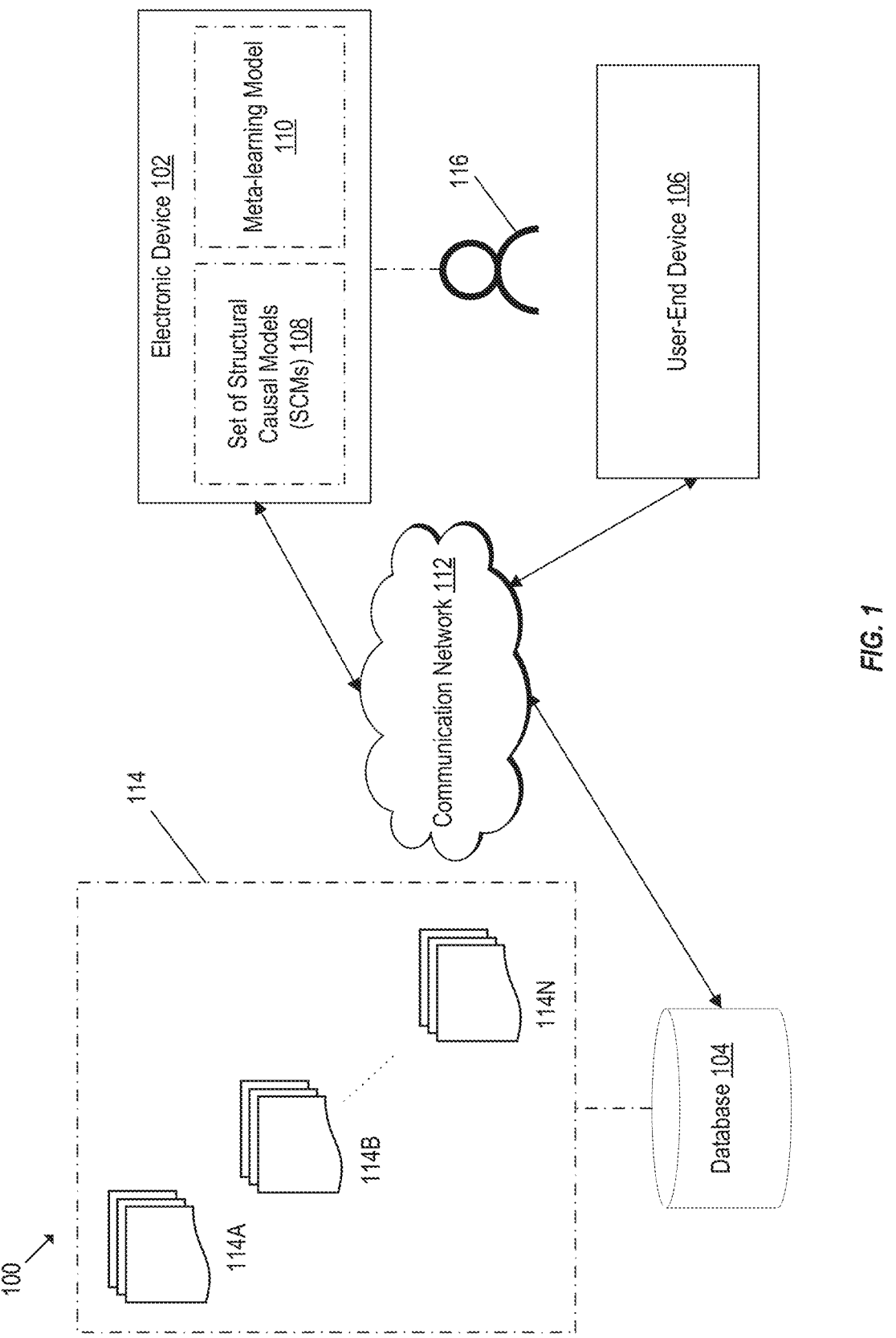
FIG. 1 is a diagram representing an example environment related to training of a meta-learning model based on a causal transportability between datasets.

Some embodiments described in the present disclosure relate to methods and systems for training of a meta-learning model based on a causal transportability between datasets. In the present disclosure, a plurality of datasets related to a plurality of application domains may be received. Based on a first user input, feature dependency information associated with a first dataset of the received plurality of datasets may be determined. Further, based on a second user input and a set of ethical requirements, feature difference information associated with the first dataset and a second dataset of the received plurality of datasets may be determined. Herein, the second dataset may be different from the first dataset. Examples of the set of ethical requirements may include, but are not limited to, a set of fairness requirements, a set of privacy requirements, or a set of security requirements. Thereafter, a set of structural causal models (SCMs) associated with the first dataset may be determined, based on the determined feature dependency information and the determined feature difference information. Further, a set of ethical coefficients associated with the set of ethical requirement may be determined based on an application of a causal transportability model on the determined set of SCMs. A trust score associated with the first dataset may be determined based on the determined set of ethical coefficients. Further, a meta-learning model associated with the plurality of application domains may be trained, based on a plurality of trust scores associated with the plurality of datasets. Herein, the plurality of trust scores may include the determined trust score associated with the first dataset.

According to one or more embodiments of the present disclosure, the technological field of Artificial Intelligence (AI) models may be improved by configuring a computing system in a manner that the computing system may be able to train a meta-learning model based on a causal transportability between datasets. The computing system may receive the plurality of datasets related to the plurality of application domains. Based on the first user input, the computing system may determine feature dependency information associated with the first dataset of the received plurality of datasets. Further, based on the second user input and the set of ethical requirements, the computing system may determine feature difference information associated with the first dataset and the second dataset of the received plurality of datasets. Herein, the second dataset may be different from the first dataset. Examples of the set of ethical requirements may include, but are not limited to, a set of fairness requirements, a set of privacy requirements, or a set of security requirements. The computing system may determine the set of SCMs associated with the first dataset, based on the determined feature dependency information and the determined feature difference information. Further, the computing system may determine the set of ethical coefficients associated with the set of ethical requirements, based on an application of the causal transportability model on the determined set of SCMs. Thus, causal effects associated with the plurality of datasets and differences between the various attributes between the plurality of datasets may be captured using SCMs, based on the feature dependency information and the feature difference information. The computing system may determine a trust score associated with the first dataset, based on the determined set of ethical coefficients. Further, the computing system may train the meta-learning model associated with the plurality of application domains, based on the plurality of trust scores associated with the plurality of datasets. Herein, the plurality of trust scores may include the determined trust score associated with the first dataset. Thus, a contribution of each dataset towards the training of the meta-learning model may be adapted based on the trust score determined for the dataset. As the trust score may factor-in expert knowledge, the meta-learning model trained based on the plurality of trust scores may incorporate ethical requirements. Further, unwanted consequences of dataset distribution shifts (such as bias) and ethical concerns (such as, privacy and security concerns) may be addressed based on the application of the causal transportability model on the set of SCMs.

Typically, conventional systems may require an access to individual datasets to train meta-learning models. The disclosed system, on the other hand, may not require an access on the individual datasets and may rely on the feature dependency information and the feature difference information associated with one or more datasets to train the meta-learning model. The feature dependency information and the feature difference information may be provided by expert users. The disclosed system may determine the set of SCMs based on the feature dependency information and the feature difference information. Further, the causal transportability model may be applied on the set of SCMs to determine the trust scores associated with the datasets. The meta-learning model may be trained based on the determined trust scores. As the individual dataset may not be directly accessed, the meta-learning model trained using the disclosed system may not be affected from distribution shifts associated with the individual datasets. Further, unlike the conventional systems, the meta-learning model, that may be trained using the disclosed system, may not be prone to biases and ethical concerns, as the disclosed system may involve human-in-the-loop and may rely on domain-specific knowledge from the expert users.

Embodiments of the present disclosure are explained with reference to the accompanying drawings.

FIG. 1 is a diagram representing an example environment related to training of a meta-learning model based on a causal transportability between datasets, arranged in accordance with at least one embodiment described in the present disclosure. With reference to FIG. 1, there is shown an environment 100. The environment 100 may include an electronic device 102, a database 104, a user-end device 106, and a communication network 112. The electronic device 102, the database 104, and the user-end device 106 may be communicatively coupled to each other, via the communication network 112. The electronic device 102 may include a set of structural causal models (SCMs) 108 and a meta-learning model 110. In FIG. 1, there is further shown a user 116 who may be associated with or operating the electronic device 102 or the user-end device 106. There is further shown a plurality of datasets 114 that may be associated with a plurality of application domains. The plurality of application domains may include a first application domain, a second application domain, . . . and an Nth application domain. The plurality of datasets 114 may include a first dataset 114A associated with the first application domain, a second dataset 114B associated with the second application domain, . . . and a Nth dataset 114N associated with the Nth application domain. The plurality of datasets 114 may be stored in the database 104.

The N number of datasets shown in FIG. 1 is presented merely as an example. The plurality of datasets 114 may include only two or more than N datasets, without deviation from the scope of the disclosure. For the sake of brevity, only N datasets have been shown in FIG. 1. However, in some embodiments, there may be more than N datasets, without limiting the scope of the disclosure.

Though the set of SCMs 108 and the meta-learning model 110 are shown as included or stored on the electronic device 102, one or more of the set of SCMs 108 and the meta-learning model 110 may be deployed or stored on separate devices, such as, a server (not shown in FIG. 1), the database 104, or the user-end device 106, without departure from the scope of the disclosure.

The electronic device 102 may include suitable logic, circuitry, interfaces, and/or code that may be configured to train the meta-learning model 110 based on an application of a causal transportability model on the set of SCMs 108, as described herein. In certain embodiments, the electronic device 102 may be configured to store the set of SCMs 108 and the meta-learning model 110, as shown in FIG. 1.

The electronic device 102 may be configured to receive the plurality of datasets 114 related to the plurality of application domains. The electronic device 102 may receive a first user input and a second user-input from one or more users, such as, the user 116. In an example, the user 116 may be an expert who may have a domain knowledge of the plurality of application domains. The electronic device 102 may be configured to determine feature dependency information associated with a first dataset (e.g., the first dataset 114A) of the received plurality of datasets 114, based on the first user input. The determined feature dependency information may include at least one of, but is not limited to, a set of input variables associated with the first dataset 114A, a set of output variables associated with the first dataset 114A, dependency information associated with the set of input variables and the set of output variables, or a confidence level associated with the dependency information. The determination of the feature dependency information is described further, for example, in FIG. 4.

The electronic device 102 may be configured to determine feature difference information associated with the first dataset 114A and a second dataset (e.g., the second dataset 114B) of the received plurality of datasets, based on the second user input and on a set of ethical requirements. The determined feature difference information may correspond to a population difference between a set of first features associated with the first dataset 114A and a set of second features associated with the second dataset 114B. Herein, the set of first features may correspond to the set of second features and the second dataset 114B may be different from the first dataset 114A. For example, the first dataset 114A may include loan-approval information associated with a first set of individuals of a certain demographic and location and the second dataset 114B may include loan-approval information associated with a second set of individuals of another demographical information and another location. The determination of the feature difference information is described further, for example, in FIG. 4.

The electronic device 102 may be configured to determine a set of SCMs (such as, the set of SCMs 108) associated with the first dataset 114A based on the determined feature dependency information and the determined feature difference information. The electronic device 102 may be further configured to determine a set of ethical coefficients associated with the set of ethical requirements based on an application of a causal transportability model on the determined set of SCMs 108. Examples of the set of ethical requirements may include at least one of, but are not limited to, a set of fairness requirements, a set of privacy requirements, or a set of security requirements. The determination of the set of SCMs 108 and the determination of the set of ethical coefficients are described further, for example, in FIG. 4. Examples of an SCM are described in FIGS. 3 and 7.

The electronic device 102 may be configured to determine a trust score associated with the first dataset 114A based on the determined set of ethical coefficients. The electronic device 102 may be further configured to train a meta-learning model (e.g., the meta-learning model 110) associated with the plurality of application domains. The training of the meta-learning model 110 may be based on a plurality of trust scores associated with the plurality of datasets 114. Herein, the plurality of trust scores may include the determined trust score associated with the first dataset 114A. The meta-learning model 110 may correspond to a generative learning model including at least one of, but is not limited to, a metric-based learning model, an optimization-based learning model, or a model-based learning model. The determination of the trust score and the training of the meta-learning model 110 are described further, for example, in FIG. 4.

Examples of the electronic device 102 may include, but are not limited to, a causality analysis machine, a meta-learning machine, a mobile device, a desktop computer, a laptop, a computer workstation, a computing device, a mainframe machine, a server, such as a cloud server, and a group of servers. In one or more embodiments, the electronic device 102 may include a user-end terminal device and a server communicatively coupled to the user-end terminal device. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

The database 104 may include suitable logic, interfaces, and/or code that may be configured to store the plurality of datasets 114. In certain embodiments, the set of SCMs 108 and the meta-learning model 110 may be stored on the database 104. In another embodiment, dataset (e.g., training dataset or test dataset) associated with the meta-learning model 110 may be stored on the database 104. The database 104 may be derived from data off a relational or non-relational database, or a set of comma-separated values (csv) files in conventional or big-data storage.

The database 104 may be stored or cached on a device, such as a server or the electronic device 102. The device storing the database 104 may be configured to receive a query for a dataset (e.g., the first dataset 114A) of the plurality of datasets 114 from the electronic device 102. In response, the device of the database 104 may be configured to retrieve and provide the queried dataset (e.g., the first dataset 114A) to the electronic device 102 based on the received query. In some embodiments, the database 104 may be hosted on a plurality of servers stored at same or different locations. The operations of the database 104 may be executed using hardware including a processor, a microprocessor (e.g., to perform or control performance of one or more operations), a field-programmable gate array (FPGA), or an application-specific integrated circuit (ASIC). In some other instances, the database 104 may be implemented using software.

The user-end device 106 may include suitable logic, circuitry, interfaces, and/or code that may be configured to render, on a display device (associated with the user-end device 106), a decision associated a situation of an application domain. The decision may be determined (for example, by the electronic device 102) based on an application of the trained meta-learning model 110 on inputs associated with the situation. As an example, the situation may be a loan approval scenario in a financial services application and the inputs may include demographic data and financial data of an individual. The decision may correspond to an automated decision (by the trained meta-learning model 110) indicative of whether a loan of the individual should be approved or not. For example, the user-end device 106 may include a web-client software or an electronic mail software, through which the user-end device 106 may receive the plurality of datasets 114. As an example, each of the plurality of datasets 114 may be a comma-separated value (csv) data file. Additionally, or alternatively, the user-end device 106 may include a spreadsheet software that may be used to generate or edit the plurality of datasets 114. The user-end device 106 may upload the generated, edited, or received plurality of datasets 114 to the electronic device 102. In addition, the user-end device 106 may upload the plurality of datasets 114 to the database 104 for storage. In an embodiment, the user-end device 106 may receive a query from the user 116 to train the meta-learning model 110 based on the plurality of datasets 114. The user-end device 106 may further send the query to the electronic device 102 and initiate the training of the meta-learning model 110. The user-end device 106 may receive (for example, from the user 116) the first user input the feature dependency information and the second user input associated with the feature difference information. The user-end device 106 may transmit the received first user input and the second user input to the electronic device 102. Examples of the user-end device 106 may include, but are not limited to, a mobile device, a desktop computer, a laptop, a computer workstation, a computing device, a mainframe machine, a server, such as a cloud server, and a group of servers. Although in FIG. 1, the user-end device 106 is separated from the electronic device 102; however, in some embodiments, the user-end device 106 may be integrated in the electronic device 102, without a deviation from the scope of the disclosure.

Each of the set of SCMs 108 may include suitable logic, circuitry, interfaces, and/or code that may be configured to represent causal relationships between variables associated with a dataset of the plurality of datasets 114. For example, each of the set of SCMs 108 may correspond to a directed acyclic graph that may represent variables associated with the first dataset 114A. The directed acyclic graph may be augmented based on a set of selection variables indicative of the determined feature difference information. In an embodiment, a population associated with the first dataset 114A may be switchable to a population associated with the second dataset 114B, based on an application of a set of conditions on different values of at least one of the set of selection variables. The set of selection variables may be determined based on a user input (e.g., the second user input) that may be received from a user, such as, the user 116. The user may be a domain knowledge expert associated with one or more of the plurality of application domains. The directed acyclic graph may be indicative of a causal effect of a set of input variables associated with the first dataset 114A on a set of output variables associated with the first dataset 114A. In addition, the directed acyclic graph may further include a set of unobserved variables that affect a set of input variables associated with the first dataset. Examples of an SCM are described in FIGS. 3 and 7.

The meta-learning model 110 may be a machine learning model, such as, a neural network model, that may be configured to make a decision associated with an application domain. In an embodiment, the meta-learning model 110 may be trained on a dataset associated with one application domain and may be tested or validated on another dataset, which may be associated with another application domain. Thus, the meta-learning model 110 may be used for predictions on data of a variety of application domains. In other words, the training of the meta-learning model 110 may be transferrable from a first application domain (on which the meta-learning model 110 may be trained) to a second application domain (on which the meta-learning model 110 may be used for prediction).

The neural network model (which may correspond to the meta-learning model 110) may be a computational network or a system of artificial neurons, arranged in a plurality of layers, as nodes. The plurality of layers of each neural network model may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model. Outputs of each hidden layer may be coupled to inputs of at least one node in other layers of the neural network model. Node(s) in the final layer may receive inputs from at least one hidden layer to output a result. The number of layers and the number of nodes in each layer may be determined from hyper-parameters of the neural network model. Such hyper-parameters may be set before or while training the neural network model on a training dataset.

Each node of the neural network model may correspond to a mathematical function (e.g., a sigmoid function or a rectified linear unit) with a set of parameters, tunable during training of the neural network model. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to same or a different mathematical function.

In training of the neural network model, one or more parameters of each node of the neural network model may be updated based on whether an output of the final layer for a given input from the training dataset matches a correct result based on a loss function for the neural network model. The above process may be repeated for same or a different input till a minima of loss function may be achieved, and a training error may be minimized. Several methods for training are known in art, for example, gradient descent, stochastic gradient descent, batch gradient descent, gradient boost, meta-heuristics, and the like.

Figure 2:
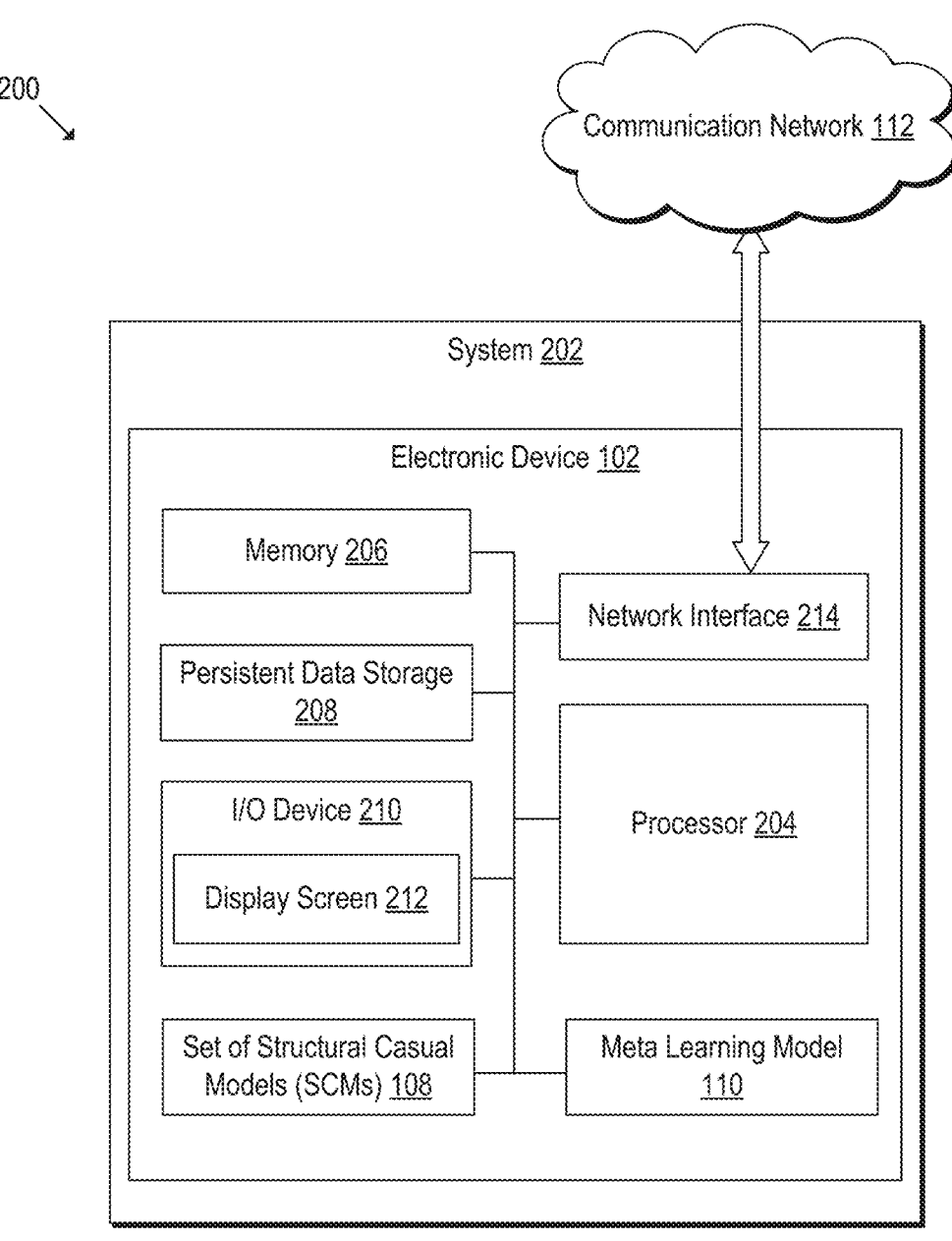
FIG. 2 is a block diagram that illustrates an exemplary electronic device for training a meta-learning model based on a causal transportability between datasets.

The neural network model may include electronic data, such as, for example, a software program, code of the software program, libraries, applications, scripts, or other logic or instructions for execution by a processing device (such as a processor 204 of the electronic device 102 of FIG. 2). The neural network model may include code and routines configured to enable a computing device including the processor to perform one or more tasks such as, make a decision (e.g., a loan approval decision) associated with a certain application domain (e.g., a banking domain). Additionally, or alternatively, the neural network model may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model may be implemented using a combination of hardware and software.

Examples of the neural network model (such as, the meta-learning model 110) may include, but are not limited to, a deep neural network (DNN), a convolutional neural network (CNN), an artificial neural network (ANN), a fully connected neural network, a deep Bayesian neural network, and/or a combination of such networks. In some embodiments, the neural network model may include numerical computation techniques using data flow graphs. In certain embodiments, the neural network model may be based on a hybrid architecture of multiple Deep Neural Networks (DNNs).

The communication network 112 may include a communication medium through which the electronic device 102 may communicate with the servers which may store the database 104, and the user-end device 106. Examples of the communication network 112 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 104 and the user-end device 106. In addition, in some embodiments, the functionality of each of the database 104 and the user-end device 106 may be incorporated into the electronic device 102, without a deviation from the scope of the disclosure.

FIG. 2 is a block diagram that illustrates an exemplary electronic device for training a meta-learning model based on a causal transportability between datasets, arranged in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, a persistent data storage 208, an input/output (I/O) device 210, a display screen 212, a network interface 214, the set of SCMs 108, and the meta-learning model 110.

The processor 204 may include suitable logic, circuitry, and/or interfaces that may be configured to execute program instructions associated with different operations to be executed by the electronic device 102. For example, some of the operations may include the reception of the plurality of datasets 114, the determination of the feature dependency information, the determination of the feature difference information, the determination of the set of SCMs 108, the determination of the set of ethical coefficients, the determination of the trust score, and the training of the meta-learning model 110. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a Graphics Processing Unit (GPU), a Central Processing Unit (CPU), a Reduced Instruction Set Computer (RISC) processor, an ASIC processor, a Complex Instruction Set Computer (CISC) processor, a co-processor, and/or a combination thereof.

The memory 206 may include suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may include suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or a special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store the received plurality of datasets 114, the determined feature dependency information, the determined feature difference information, the determined set of ethical coefficients, and the determined trust score. Either of the memory 206, the persistent data storage 208, or combination may further store the set of SCMs 108 and the meta-learning model 110.

The I/O device 210 may include suitable logic, circuitry, interfaces, and/or code that may be configured to receive a user input. For example, the I/O device 210 may receive a user input indicative of a query to train the meta-learning model 110. In another example, the I/O device 210 may receive the first user input corresponding to the feature dependency information. The I/O device 210 may further receive the second user input corresponding to the feature difference information. The I/O device 210 may further receive a user input including a query to determine a decision related to a certain application domain, based on an application of the meta-learning model 110 on a certain input data. The I/O device 210 may be further configured to provide an output in response to the received user inputs. For example, the I/O device 210 may render an automated decision output (as may be determined by the trained meta-learning model 110 of the electronic device 102) on the display screen 212. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display (e.g., the display screen 212) and a speaker.

The display screen 212 may comprise suitable logic, circuitry, interfaces, and/or code that may be configured to display the generated first image. The display screen 212 may be configured to receive the user inputs (e.g., the query to train the meta-learning model 110, the first user input, the second user input, and/or the query to determine the decision related to the certain application domain) from the user 116. In such cases the display screen 212 may be a touch screen to receive the user inputs. The display screen 212 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 214 may comprise suitable logic, circuitry, interfaces, and/or code that may be configured to establish a communication between the electronic device 102, the server/device of the database 104, and the user-end device 106, via the communication network 112. The network interface 214 may be implemented by use of various known technologies to support wired or wireless communication of the electronic device 102, via the communication network 112. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
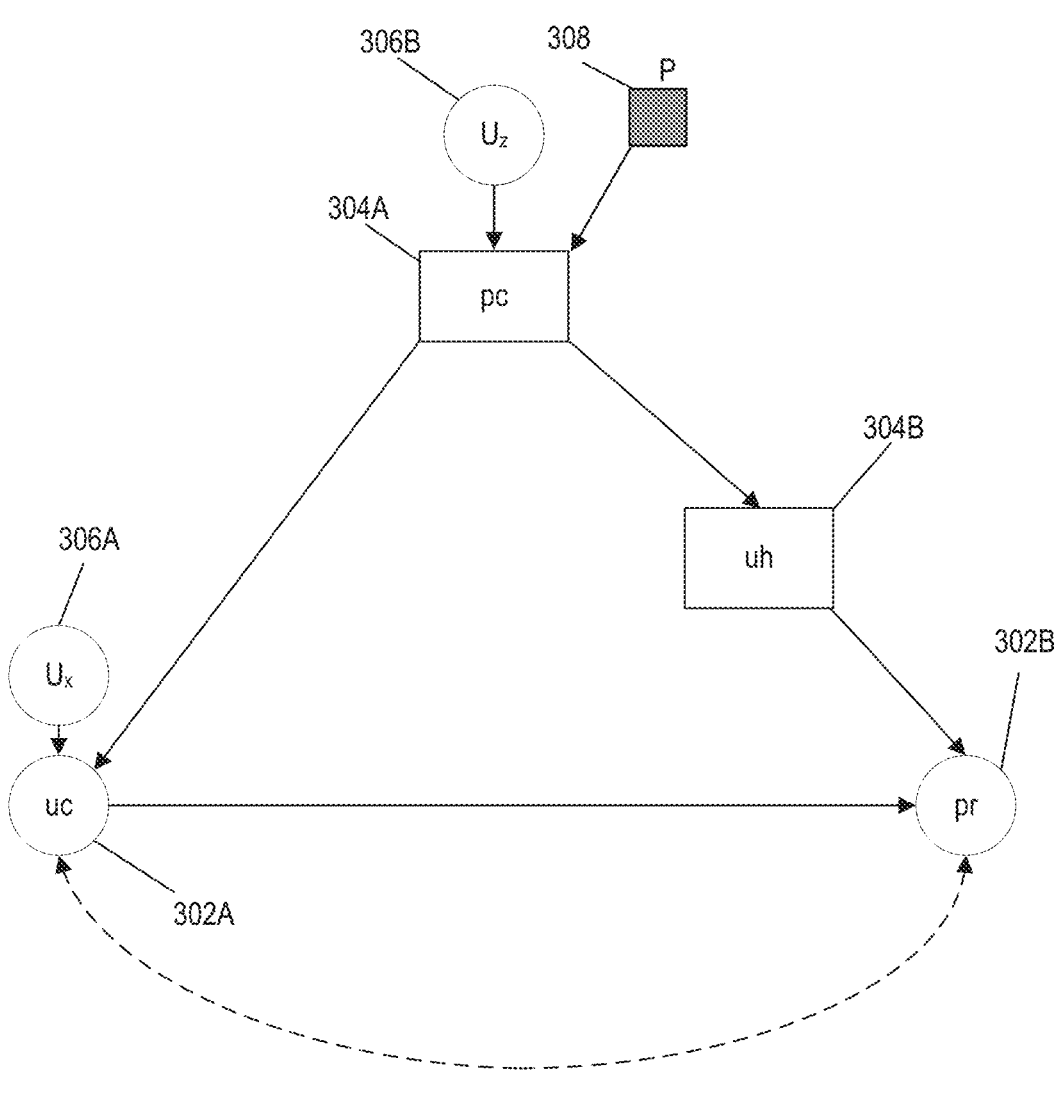
FIG. 3 is a diagram that illustrates an exemplary structural causal model (SCM) associated with a pair of datasets corresponding to an application domain.

FIG. 3 is a diagram that illustrates an exemplary structural causal model (SCM) associated with a pair of datasets corresponding to an application domain, in accordance with an embodiment of the disclosure. FIG. 3 is described in conjunction with elements from FIG. 1, and FIG. 2. With reference to FIG. 3, there is shown an exemplary structural causal model (SCM) 300. The SCM 300 may correspond to an application domain such as, for example, an online product recommendation application that may involve individuals with disability.

The SCM 300 may be related to a pair of datasets associated with the application domain of online product recommendations. For example, the SCM 300 may be related to the first dataset 114A and the second dataset 114B. The SCM 300 may correspond to a directed acyclic graph representative of variables associated with a dataset (e.g., the first dataset 114A). The directed acyclic graph of the SCM 300 may include a plurality of nodes such as, a set of first nodes, a set of second nodes, a set of third nodes and a set of selection nodes. The directed acyclic graph may be indicative of a causal effect of a set of input variables associated with the first dataset 114A on a set of output variables associated with the first dataset 114A. The set of first nodes may include a first node 302A that may represent a user click variable (denoted by "uc") and a second node 302B that may represent a product recommendation variable (denoted by "pr"). The user click variable (denoted by "uc") may be an input variable, and the product recommendation variable (denoted by "pr") may be an output variable. The set of second nodes may include a first node 304A that may represent a physical condition variable (denoted by "pc") and a second node 304B that may represent a user history variable (denoted by "uh"). Both the physical condition variable (denoted by "pc") and the user history variable (denoted by "uh") may be input variables. The directed acyclic graph of the SCM 300 may further include a set of unobserved variables that may affect a set of input variables associated with the first dataset 114A. The set of third nodes may include a first node 306A that may represent a first unobserved variable (denoted by "$U_x$") that may affect the user click variable (denoted by "uc"). For example, the first unobserved variable may correspond to a user's purchase intent, which may not be observed directly. The set of third nodes may further include a second node 306B that may represent a second unobserved variable (denoted by "Uc") that may correspond to product characteristics, which may affect the physical condition variable (denoted by "pc").

The directed acyclic graph of the SCM 300 may be augmented based on a set of selection variables indicative of the determined feature difference information between the first dataset 114A and the second dataset 114B. Herein, a population associated with the first dataset 114A may be switchable to a population associated with the second dataset 114B, based on an application of a set of conditions on different values of at least one of the set of selection variables. For example, the set of selection nodes corresponding to the SCM 300 may include a node 308 that may indicate that the physical condition variable (denoted by "pc") may be a selection variable on which a population of the first dataset 114A may be switchable to a population of the second dataset 114B. For example, the first dataset 114A and the second dataset 114B may include differences based on physical conditions of individuals. In other words, the physical conditions variable may have differences across datasets, such as the first dataset 114A and the second dataset 114B. Further, as shown in FIG. 3, certain nodes of the SCM 300 may be square nodes. The square nodes may indicate that the variables represented by such nodes may be different across different individuals within the same dataset. For example, the variables user history (denoted by "uh") and physical condition (denoted by "pc") may be different across different individuals within the first dataset 114A. An example of an SCM associated with a banking application domain is described further, for example, in FIG. 7.

It should be noted that the SCM 300 shown in FIG. 3 is for exemplary purposes and should not be construed to limit the scope of the disclosure.

FIG. 4 is a diagram that illustrates a flowchart of an example method for training a meta-learning model based on a causal transportability between datasets, in accordance with an embodiment of the disclosure. FIG. 4 is described in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the example electronic device 102 of FIG. 1 or the processor 204 of FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, the plurality of datasets 114 related to the plurality of application domains may be received. In an embodiment, the processor 204 may be configured to receive the plurality of datasets 114 related to the plurality of application domains. For example, the plurality of datasets 114 may include the first dataset 114A, which may correspond to a banking domain associated with a first location. Further, the plurality of datasets 114 may include the second dataset 114B, which may correspond to the banking domain associated with a second location. In another example, the first dataset 114A may correspond to the banking domain associated with the first location and the second dataset 114B may correspond to an insurance domain associated with the first location. In certain scenarios, the processor 204 may receive the plurality of datasets 114 from the database 104. On receipt of the plurality of datasets 114, the processor 204 may store the received plurality of datasets 114 in the memory 206. In another scenario, the plurality of datasets 114 may be pre-stored in the memory 206 and the processor 204 may retrieve the pre-stored plurality of datasets 114 from the memory 206.

At block 404, the feature dependency information associated with the first dataset 114A of the received plurality of datasets 114 may be determined, based on the first user input. In an embodiment, the processor 204 may be configured to determine the feature dependency information associated with the first dataset 114A, based on the first user input. In an embodiment, the feature dependency information may include at least one of, but not limited to, a set of input variables associated with the first dataset 114A, a set of output variables associated with the first dataset 114A, dependency information associated with the set of input variables and the set of output variables, or a confidence level associated with the dependency information. For example, the processor 204 may receive the first user input that may include a set of input variables and a set of output variables associated with the first dataset 114A. As an example, in case the first dataset 114A is related to a banking domain, the set of input variables may include an income variable, an age variable, a gender variable, and a credit score variable. Further, in such case, the set of output variables may include a loan decision variable (which may be a binary variable representative of a prediction output of the meta-learning model 110). The received first user input may further include dependency information associated with the set of input variables and the set of output variables. The dependency information may indicate whether a certain input variable of the set of input variables affects a particular output variable of the set of output variable. Also, the received first user input may include the confidence level associated with the dependency information. The confidence level associated with the dependency information may indicate a level of certainty that the user 116 may have towards the dependency information. In other words, a higher confidence level may indicate the user 116 may have a high confidence that a certain input variable affects a certain output variable of the first dataset 114A. For example, the user 116 may have a 90% confidence level that the income and credit score of an individual (two input variables) may affect the loan decision output (an output variable) associated with the first dataset 114A corresponding to the banking domain. Thus, in current case, the dependency information may indicate that the income variable and the credit score variable may be affect the loan decision variable and there may be a 90% confidence level associated with such dependency information.

The first user input may be received from an expert user (such as, the user 116), who may have a domain-knowledge associated with one or more of the plurality of application domains. For example, the expert user may be a financial consultant with knowledge of the banking domain. Also, as the first user input may include the confidence level associated with the dependency information, a degree of reliability of the dependency information may be quantifiable. Therefore, the first user input (from the expert user) may be accurate and useful to determine the feature dependency information.

At block 406, the feature difference information associated with the first dataset 114A and the second dataset 114B of the plurality of datasets 114 may be determined, based on the second user input and the set of ethical requirements. Herein, the first dataset 114A may be different from the second dataset 114B. For example, the first dataset 114A may correspond to a banking domain associated with a first location and the second dataset 114B may correspond to a banking domain associated with a second location different from the first location. As an example, the second location may be in a different region than the first location. In an embodiment, the processor 204 may be configured to determine the feature difference information associated with the first dataset 114A and the second dataset 114B, based on the second user input and the set of ethical requirements. The feature difference information may correspond to a population difference between a set of first features associated with the first dataset 114A and a set of second features associated with the second dataset 114B. Further, the set of first features may correspond to the set of second features. For example, the second user input may include one or more input variables that may be different across the first dataset 114A and the second dataset 114B. Consider a scenario where the first dataset 114A corresponds to a banking domain dataset associated with a rural location and the second dataset 114B corresponds to a banking domain dataset associated with an urban location. As an example, the set of first features may include a gender variable associated with the first dataset 114A of rural individuals and the set of second features may include a gender variable associated with the second dataset 114B of urban individuals. The gender variable may have different values across the first dataset 114A and the second dataset 114B. Typically, rural men may have a significantly higher probability to get a loan approval than rural women of a certain age group (e.g., 25-40 years). However, loan approval probabilities of urban men and urban women of the same age group (i.e., 25-40 years) may have a lesser difference. In such case, for the loan approval decision, there may be a greater gender bias (in favor of men) in the rural population as compared to the urban population. Thus, the gender variable may have different values between the rural location dataset and the urban location dataset.

In an embodiment, the second user input may further include a confidence level associated with the feature difference information. The confidence level associated with the feature difference information may indicate a level of certainty that the user 116 may have towards the feature difference information including the one or more input variables that may have different values across the first dataset 114A and the second dataset 114B. In other words, a higher confidence level may indicate the user 116 may have a high confidence that a certain input variable may have different values across the first dataset 114A and the second dataset 114B. For example, the user 116 may have a 90% confidence level that the gender variable may have different values across the first dataset 114A and the second dataset 114B. Thus, in current case, the second user input may indicate that the user 116 may have a 90% confidence level that the gender variable may have different values between the first dataset 114A and the second dataset 114B.

The determination of the feature difference information may be further based on the set of ethical requirements that may be associated with an application domain for which the meta-learning model 110 may be trained. Examples of the set of ethical requirements may include at least one of, but not limited to, a set of fairness requirements, a set of privacy requirements, or a set of security requirements. For example, in case the set of requirements associated with the banking domain includes a privacy requirement, the feature difference information may be determined without a need to access to the underlying demographic or financial data of individuals in the first dataset 114A and the second dataset 114B. In such case, the feature difference information may be determined from the second user input, which may be based on the domain knowledge of expert users associated with the banking domain and not based on the underlying data or statistics associated with the first dataset 114A and/or the second dataset 114B. Thus, the underlying demographic or financial data may not be required to be shared with anyone, thereby ensuring privacy. In another example, in case the set of requirements associated with the banking domain includes a fairness requirement, the gender variable may be selected as a feature difference as there may be a difference of values or a bias across the first dataset 114A and the second dataset 114B with respect to the gender variable.

At block 408, the set of SCMs 108 associated with the first dataset 114A may be determined based on the determined feature dependency information and the determined feature difference information. In an embodiment, the processor 204 may be configured to determine the set of SCMs 108 associated with the first dataset 114A based on the determined feature dependency information and the determined feature difference information. The determination of the set of SCMs 108 is described further, for example, in FIG. 5. Examples of an SCM are described further, for example, in FIGS. 3 and 7.

At block 410, the set of ethical coefficients associated with the set of ethical requirements may be determined based on an application of a causal transportability model on the determined set of SCMs 108. In an embodiment, the processor 204 may be configured to determine the set of ethical coefficients associated with the set of ethical requirements based on the application of the causal transportability model on the determined set of SCMs. The set of ethical coefficients may include an ethical coefficient for each ethical requirement of the set of ethical requirements. For example, the set of ethical coefficients may include a fairness coefficient associated with a fairness requirement, a privacy coefficient associated with a privacy requirement, and a security coefficient associated with a security requirement. In an embodiment, each of the set of ethical coefficients may be determined based on the confidence level associated with the feature difference information, and a causal transportability coefficient associated with the first dataset 114A and the second dataset 114B. Further, the causal transportability coefficient may be determined by use of the causal transportability model. The causal transportability model may correspond to a causal fusion tool. The determination of the set of ethical coefficients is described further, for example, in FIGS. 5 and 6.

At block 412, the trust score associated with the first dataset 114A may be determined based on the determined set of ethical coefficients. In an embodiment, the processor 204 may be configured to determine the trust score associated with the first dataset 114A based on the determined set of ethical coefficients. In an embodiment, the trust score may be determined based on a weighted average of the determined set of ethical coefficients. The determination of the trust score is described further, for example, in FIGS. 5 and 6.

At block 414, the meta-learning model 110 associated with the plurality of application domains may be trained, based on a plurality of trust scores associated with the plurality of datasets 114. The plurality of trust scores may include the determined trust score associated with the first dataset 114A. In an embodiment, the processor 204 may be configured to train the meta-learning model 110 associated with the plurality of application domains, based on the plurality of trust scores associated with the plurality of datasets 114. The determination of the plurality of trust scores may be similar to the determination of the trust score associated with the first dataset 114A. The meta-learning model 110 may correspond to a generative learning model including at least one of, but not limited to, a metric-based learning model, an optimization-based learning model, or a model-based learning model. Once the meta-learning model 110 is trained, the meta-learning model 110 may be used for prediction tasks associated with various application domains, for example, an insurance domain associated with the first location or a banking domain associated with a third location, and the like. The training of the meta-learning model 110 is described further, for example, in FIGS. 5 and 6. Control may pass to end.

Although the flowchart 400 is illustrated as discrete operations, such as 402, 404, 406, 408, 410, 412, and 414. However, in certain embodiments, such discrete operations may be further divided into additional operations, combined into fewer operations, or eliminated, depending on the particular implementation without detracting from the essence of the disclosed embodiments.

Figure 5:
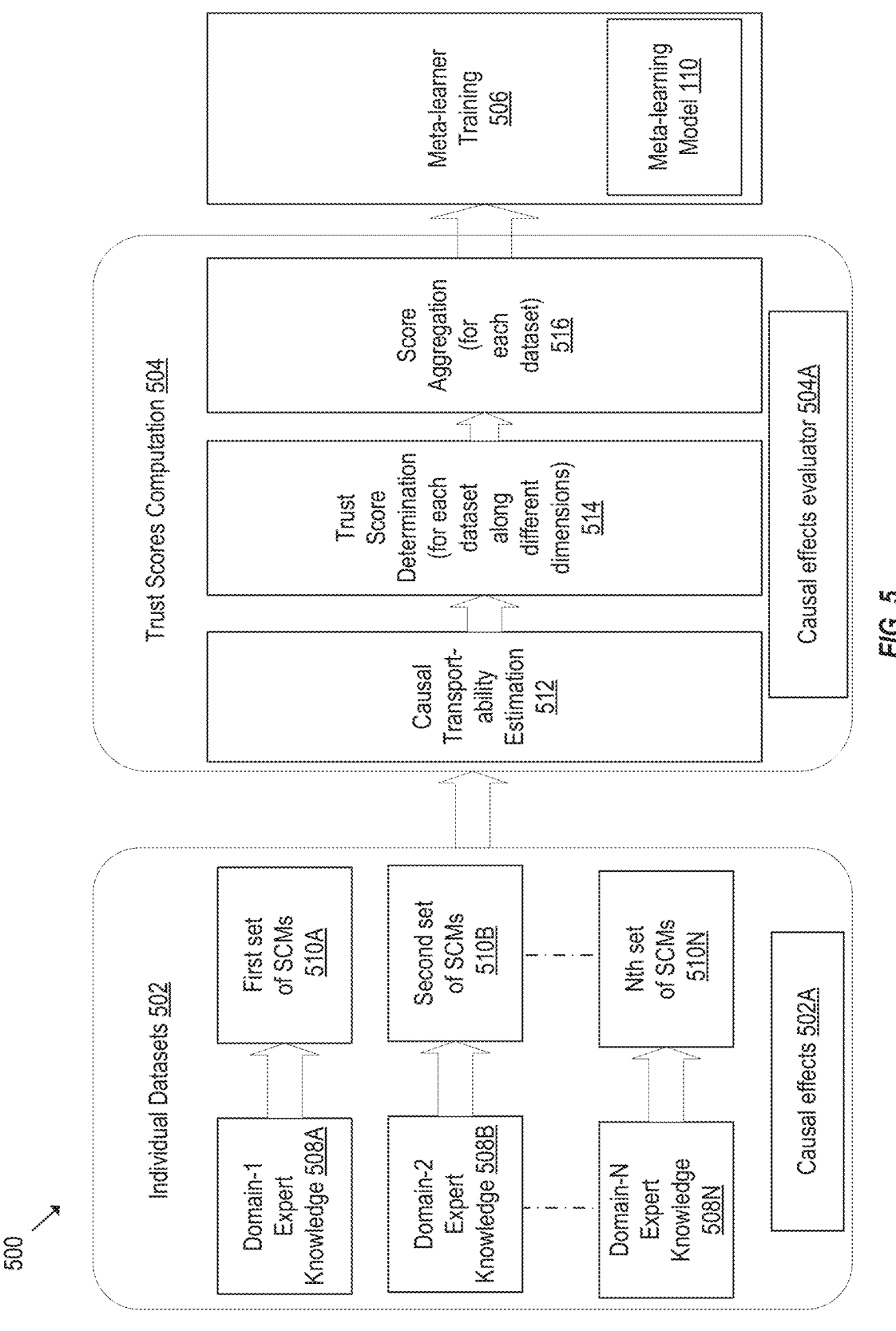
FIG. 5 is a diagram that illustrates an exemplary scenario for training a meta-learning model based on a causal transportability between datasets.

FIG. 5 is a diagram that illustrates an exemplary scenario for training a meta-learning model based on a causal transportability between datasets, in accordance with an embodiment of the disclosure. FIG. 5 is described in conjunction with elements from FIG. 1, FIG. 2, FIG. 3, and FIG. 4. With reference to FIG. 5, there is shown an exemplary scenario 500. The scenario 500 may illustrate training of the meta-learning model 110 based on a causal transportability between datasets. The scenario 500 may include individual datasets 502, operations for trust scores computation 504, and an operation for a meta-learner training 506.

For example, the individual datasets 502 may include the plurality of datasets 114 that may be associated with the plurality of application domains. The plurality of application domains may include a domain-1, a domain-2, . . . and a domain-N. A domain expert or an expert user (e.g., the user 116) may be associated with each of the plurality of application domains. The domain expert (or expert user) associated with a certain application domain may have domain knowledge related to the particular application domain. In FIG. 5, there is shown a set of blocks that may represent the domain knowledge associated with each of the plurality of application domains. For example, a domain-1 expert knowledge 508A may be associated with the domain-1, a domain-2 expert knowledge 508B may be associated with the domain-2, . . . and a domain-N expert knowledge 508N may be associated with the domain-N.

The N number of application domains related to the individual datasets 502 of FIG. 5 is presented merely as an example. The plurality of application domains may include only two or more than N application domains, without deviation from the scope of the disclosure. For the sake of brevity, only N application domains are shown. However, in some embodiments, there may be more than N application domains, without limiting the scope of the disclosure.

Based on the domain knowledge of a certain application domain, the processor 204 may receive the first user input (corresponding to the feature dependency information) and the second user input (corresponding to the feature difference information) from the domain expert associated with the particular application domain. For example, each domain expert may provide the first user input, which may include a set of input variables and a set of output variables associated with a dataset of the application domain of the domain expert, dependencies between the set of input variables and the set of output variables, and a confidence level associated with the dependencies. Further, each domain expert may identify features that may be different between the dataset associated with the domain expert's application domain and datasets associated with the remaining application domains of the plurality of application domains. Also, the domain expert may specify a confidence level associated with the identified feature differences. The domain expert may provide the identified feature differences and the confidence level associated with the feature differences as the second user input.

The determination of the feature difference information may be further based on the set of ethical requirements, such as, the set of privacy requirements, the set of fairness requirements, and the set of security requirements. For example, for a security requirement, a domain expert may encode differences in variables (across the datasets) that may differ in vulnerability to attacks. As an example, some features such as, a credit score, may be susceptible to attacks as the credit score may be prone to easy manipulation. However, a feature such as, an address may not be prone to easy manipulation. Thus, the second user input may include an indication that the credit score feature may be different across datasets and may be a security requirement associated with the determination of an SCM. In another example, for a privacy requirement, a domain expert may encode differences in variables (across the datasets) that may be private based on local regulations. For example, an age of a candidate may be a private feature for a job application. Thus, the second user input may include an indication that the age feature may be different across datasets and may be a privacy requirement associated with the determination of an SCM. In another example, for a fairness requirement, a domain expert may indicate variables that may be prone to a bias across datasets. For example, the second user input may include an indication that a gender variable may be different across datasets and may be a fairness requirement associated with the determination of an SCM.

The processor 204 may determine a set of SCMs for each application domain based on the feature dependency information and the feature difference information. For a certain dataset (e.g., the first dataset 114A related to the domain-1), the processor 204 may determine (N−1) SCMs (in case of N datasets), wherein each such SCM may consider a pair of datasets including the first dataset 114A and another dataset (that may be related to another domain). Further, as the feature difference information may vary for the various ethical requirements, the processor 204 may determine separate SCMs for each ethical requirement. For example, in case of 3 ethical requirements (e.g., the privacy requirement, the fairness requirement, and the security requirement), the processor 204 may determine 3 separate SCMs per dataset. Therefore, a total of 3*(N−1) SCMs may be determined as the set of SCMs (e.g., a first set of SCMs 510A) associated with the domain-1 (corresponding to the first dataset 114A). Similarly, the processor 204 may determine 3*(N−1) SCMs as a second set of SCMs 510B associated with the domain-2 (corresponding to the second dataset 114B), . . . and 3*(N−1) SCMs as an Nth set of SCMs 510N associated with the domain-N (corresponding to the Nth dataset 114N). Each SCM may model causal effects (e.g., causal effects 502A) related to an application domain associated with the SCM.

Each of the determined set of SCMs may correspond to a directed acyclic graph representative of variables associated with a dataset. In an embodiment, the first user input may indicate nodes of an SCM associated with the dataset (e.g., the first dataset 114A). The first user input may further include dependence information between the nodes of the SCM. The dependence information may be represented in the SCM by directed edges between the nodes. In an embodiment, the second user input may indicate nodes of the SCM that may correspond to feature differences between a pair of datasets (e.g., the first dataset 114A and the second dataset 114B) corresponding to the SCM. Such indicated nodes may be represented as square nodes in the SCM. Also, one or more of the features that may be different between the pair of datasets may be selected as a set of selection variables. The directed acyclic graph of the SCM may be augmented based on the set of selection variables (which may be indicative of the determined feature difference information). The second user input may include the set of selection variables, which may be represented in the SCM by concentric nodes. An example of an SCM associated with a banking domain is described further, for example, in FIG. 7.

The trust scores computation 504 may include operations, such as, a causal transportability estimation 512, a trust score determination 514 (for each dataset along different dimensions based on various ethical requirements), and a score aggregation 516 (for each dataset). The processor 204 may execute the operations associated with the trust score computation 504 by use of a causal effect evaluator 504A, such as, a causal transportability model. In an embodiment, the causal transportability model may correspond to a causal fusion tool. Details related to the trust score computation 504 are described further, for example, in FIG. 6.

Based on the output of the trust score computation 504, the processor 204 may train the meta-learning model 110 by use of an operation, such as, the meta-learner training 506. For example, an aggregated trust score output may be determined based on the score aggregation 516. Based on the aggregated trust score output, the processor 204 may execute the meta-learner training 506 on the meta-learning model 110 to tune the weights of the meta-learning model 110 and thereby train the meta-learning model 110. The meta-learner training 506 is described further, for example, in FIG. 6.

It should be noted that the scenario 500 of FIG. 5 is for exemplary purposes and should not be construed to limit the scope of the disclosure.

Figure 6:
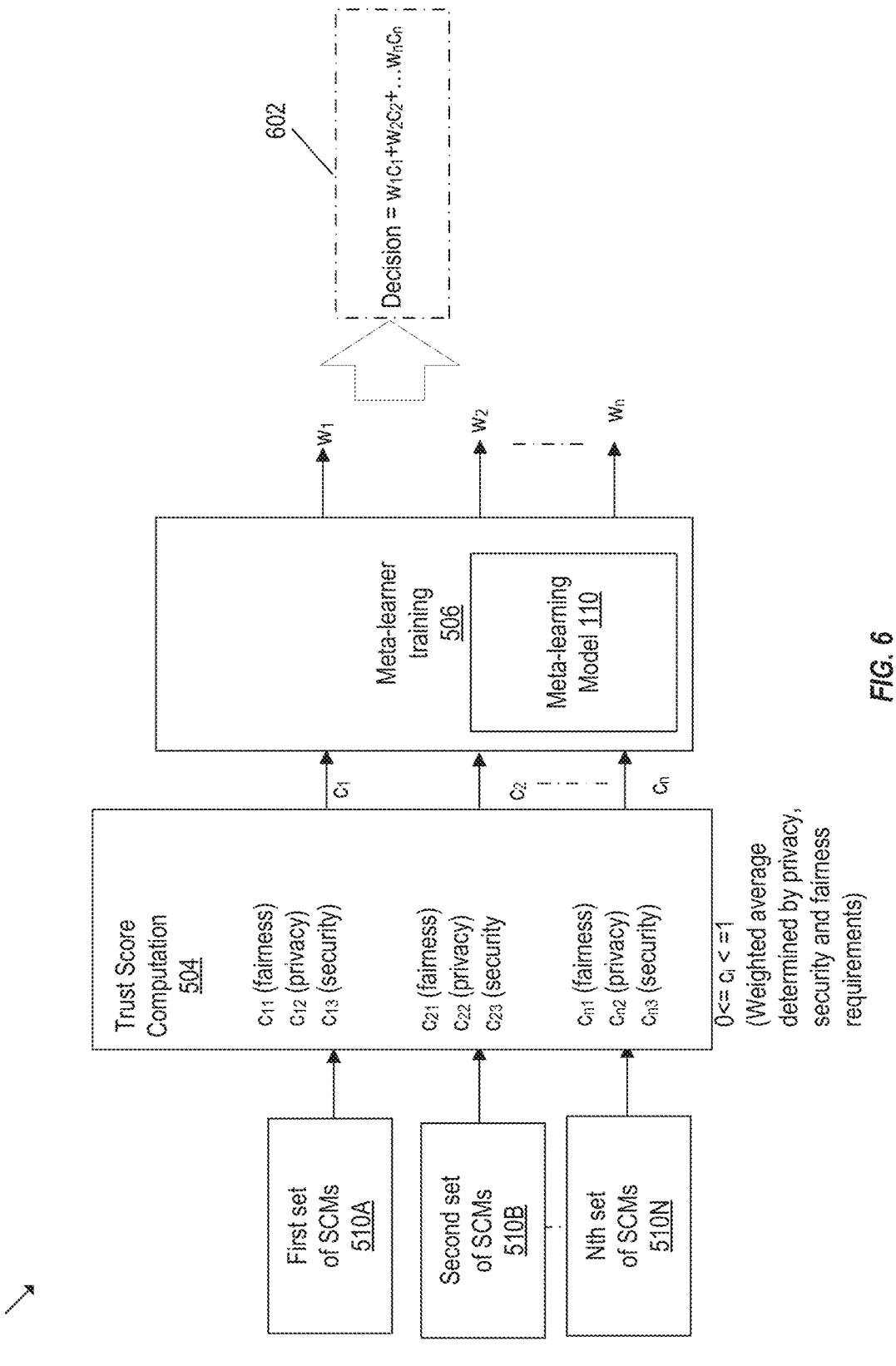
FIG. 6 is a diagram that illustrates an exemplary scenario for training a meta-learning model based on a causal transportability between datasets.

FIG. 6 is a diagram that illustrates an exemplary scenario for training a meta-learning model based on a causal transportability between datasets, in accordance with an embodiment of the disclosure. FIG. 6 is described in conjunction with elements from FIG. 1, FIG. 2, FIG. 3, FIG. 4, and FIG. 5. With reference to FIG. 6, there is shown an exemplary scenario 600. The scenario 600 may illustrate training of the meta-learning model 110 based on a causal transportability between datasets. The scenario 600 may include a plurality of sets of SCMs, operations for the trust score computation 504, and an operation for the meta-learner training 506. Also, there is shown a decision 602 of the meta-learning model 110.

The plurality of sets of SCMs may include the first set of SCMs 510A associated with the first dataset 114A (corresponding to the domain-1), the second set of SCMs 510B associated with the second dataset 114B (corresponding to the domain-2), . . . and the Nth set of SCMs 510N associated with the Nth dataset 114N (corresponding to the domain-N). The determination of the plurality of sets of SCMs is described further, for example, in FIG. 5. An example of an SCM associated with a banking domain is described further, for example, in FIG. 7.

The processor 204 may execute operations associated with the trust scores computation 504 based on the plurality of sets of SCMs. The processor 204 may determine the set of ethical coefficients associated with the set of ethical requirements based on an application of a causal transportability model on the determined set of SCMs (e.g., the plurality of sets of SCMs). In an embodiment, each of the set of ethical coefficients (for a dataset, such as, the first dataset 114A) may be determined based on the confidence level associated with the feature difference information, and the causal transportability coefficient (which may be associated with the first dataset 114A and the second dataset 114B). With reference to FIG. 5, the trust scores computation 504 may include operations such as, the causal transportability estimation 512, the trust score determination 514, and the score aggregation 516. In the causal transportability estimation 512, the processor 204 may determine a causal transportability coefficient associated with a pair of datasets that may be associated with each of the plurality of sets of SCMs. For example, a first SCM of the first set of SCMs 510A may be associated with the first dataset 114A and the second dataset 114B. For the first SCM, the processor 204 may determine the causal transportability coefficient associated with the first dataset 114A and the second dataset 114B. In an embodiment, the causal transportability coefficient may be determined by use of a causal transportability model. The causal transportability model may correspond to a causal fusion tool. Based on one or more feature differences (as indicated by the feature difference information) between two datasets, the causal fusion tool may automatically determine whether causal effects related to one dataset may be transportable to the other dataset. In an embodiment, the causal transportability coefficient may be a binary value, wherein a value of '0' may indicate that the causal effects may not be transportable, while a value of '1' may indicate that the causal effects may be transportable from one dataset to the other dataset.

In the trust score determination 514, the processor 204 may determine an ethical coefficient associated with each of the set of ethical requirements for each of the plurality of sets of SCMs. For example, for the first dataset 114A (corresponding to the domain-1), the first set of SCMs 510A may include a first subset of SCMs corresponding to the fairness requirement, a second subset of SCMs corresponding to the privacy requirement, and a third subset of SCMs corresponding to the security requirement. Each of the three subsets of SCMs may include (N−1) SCMs corresponding to a certain ethical requirement. The (N−1) SCMs in a subset of SCMs may be determined based on the feature dependency information of the first dataset 114A and the feature difference information associated with the first dataset 114A and the other datasets in the plurality of datasets 114. For example, a first SCM of the (N−1) SCMs may capture feature differences between the first dataset 114A and the second dataset 114B, a second SCM of the (N−1) SCMs may capture feature differences between the first dataset 114A and a third dataset 114C, and so on. In an example, the processor 204 may determine an ethical coefficient (denoted by $c_{ij}$) related to each of the three subsets of SCMs for the first dataset 114A, by use of equation (1), as follows:

$$c_{ij} = \frac{1}{n-1} \sum_{k=1}^{n-1} \exp(-\text{expert\_confidence}_k * \text{transportability}_k) \qquad (1)$$

where, $c_{ij}$ may represent a $j^{th}$ ethical coefficient associated with an $i^{th}$ dataset and a $j^{th}$ ethical requirement;

n may represent a number of the plurality of datasets 114;

exp(.) may represent an exponential function;

$\text{expert\_confidence}_k$ (for example, a real number between 0 and 1) may represent a confidence level (of a domain expert) associated with the feature difference information of the $k^{th}$ SCM in a subset of SCMs; and $\text{transportability}_k$ (for example, a binary value, such as, '0' or '1') may represent a causal transportability coefficient associated with the $k^{th}$ SCM.

For example, as shown in FIG. 6, for the first dataset 114A, the processor 204 may determine an ethical coefficient "$c_{11}$" associated with the fairness requirement, an ethical coefficient "$c_{12}$" associated with the privacy requirement, and an ethical coefficient "$c_{13}$" associated with the security requirement. Similarly, for the second dataset 114B, the processor 204 may determine the set of ethical coefficients (such as, "$c_{21}$", "$c_{22}$", and "$c_{23}$") associated with the set of ethical requirements (such as, the fairness requirement, the privacy requirement, and the security requirement, respectively).

In the score aggregation 516, the processor 204 may determine a trust score (denoted by $c_j$) associated with each dataset (e.g., the first dataset 114A) based on the determined set of ethical coefficients associated with the dataset. In an embodiment, the trust score may be determined based on a weighted average of the determined set of ethical coefficients. In an example, the processor 204 may determine the trust score associated with a dataset (e.g., the first dataset 114A) by use of equation (2), as follows:

$$c_i = \frac{1}{m}\sum_{j=1}^{m} c_{ij} * \text{weight}_j \qquad (2)$$

where, $c_i$ may represent the trust score associated with an $j^{th}$ dataset;

m may represent a number of ethical coefficients (for example, m=3 in case the set of ethical coefficients includes a fairness coefficient, a privacy coefficient, and a security coefficient);

$c_{ij}$ may represent a $j^{th}$ ethical coefficient for the $j^{th}$ dataset; and $\text{weight}_j$ may represent a weight associated with the $j^{th}$ ethical coefficient.

In an embodiment, a sum of the weights (i.e., $\text{weight}_j$) associated with the ethical coefficients may equal 1 and the value of the trust score (i.e., $c_i$) may lie between 0 and 1. Thus, the processor 204 may determine the trust score (i.e., $c_i$) for each dataset (e.g., a dataset;) of the plurality of datasets 114. For example, a plurality of trust scores $c_1$, $c_2$, ... $c_n$ may be determined for the plurality of datasets 114 (including the first dataset 114A, the second dataset 114B, ... and the Nth dataset 114N, respectively).

In the meta-learner training 506, the processor 204 may train the meta-learning model 110 based on the plurality of trust scores associated with the plurality of datasets 114. As described, the plurality of trust scores may include the determined trust score associated with the first dataset 114A. In an embodiment, the meta-learning model 110 may correspond to a generative learning model including at least one of, but not limited to, a metric-based learning model, an optimization-based learning model, or a model-based learning model. For example, the meta-learning model 110 may be associated with a certain application domain and may be pre-trained based on a training dataset (e.g., historical data) associated with the application domain. Based on the pre-training of the meta-learning model 110, a set of weights associated with the meta-learning model 110 may be determined. The set of weights may correspond to various ethical requirements associated with the application domain of the meta-learning model 110. Thus, based on the historical data in the training dataset, a prior ethical behavior of the meta-learning model 110 may be known. For example, based on the historical data of a banking domain, the meta-learning model 110 may be trained such that a security requirement may have a higher priority than a fairness requirement. The processor 204 may tune the determined set of weights of the meta-learning model 110 to train the meta-learning model 110. The tuning of the determined set of weights of the meta-learning model 110 may be based on a test dataset, which may include the plurality of trust scores (i.e., $c_1$, $c_2$, ... and $c_n$) associated with the plurality of datasets 114. The processor 204 may determine a decision 602 (e.g., a loan approval decision) associated with an application domain (e.g., a banking domain) corresponding to the meta-learning model 110 by use of equation (3), as follows:

$$d = c_1 * w_1 + c_2 * w_2 + \ldots + c_n * w_n \qquad (3)$$

where, d may represent the decision 602 of the meta-learning model 110;

$c_1$, $c_2$, ... $c_n$ may represent the plurality of trust scores associated with the plurality of datasets 114; and $w_1$, $w_2$, ... $w_n$ may represent the set of weights of the meta-learning model 110.

It should be noted that the scenario 600 of FIG. 6 is for exemplary purposes and should not be construed to limit the scope of the disclosure.

Figure 7:
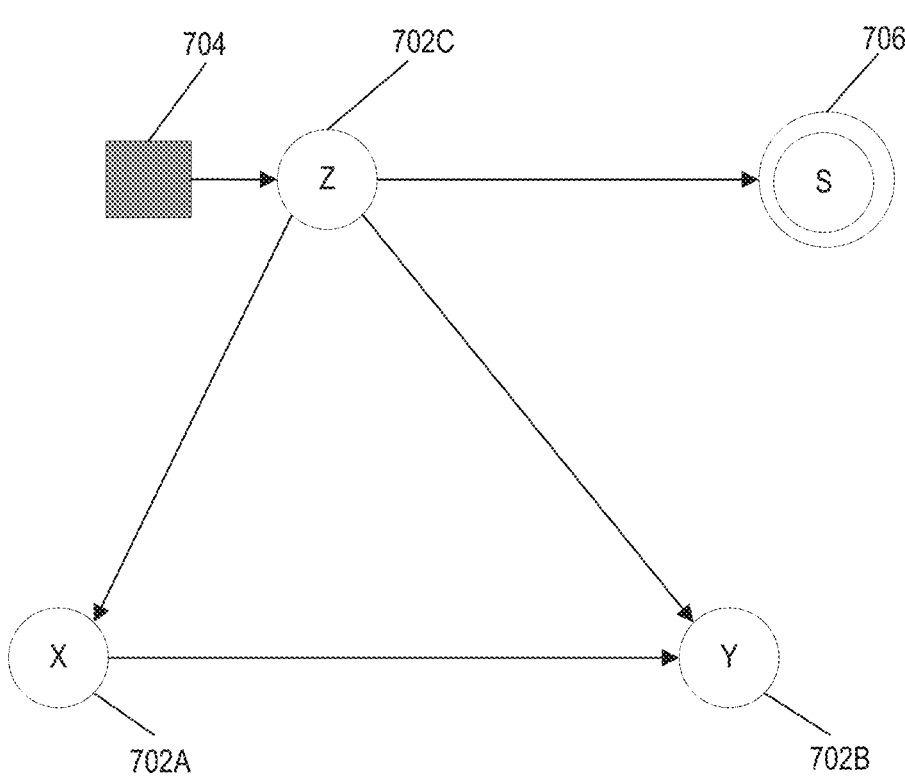
FIG. 7 is a diagram that illustrates an exemplary structural causal model (SCM) associated with a pair of datasets corresponding to a banking application domain, all according to at least one embodiment described in the present disclosure.

FIG. 7 is a diagram that illustrates an exemplary structural causal model (SCM) associated with a pair of datasets corresponding to a banking application domain, in accordance with an embodiment of the disclosure. FIG. 7 is described in conjunction with elements from FIG. 1, FIG. 2, FIG. 3, FIG. 4, FIG. 5, and FIG. 6. With reference to FIG. 7, there is shown an exemplary structural causal model (SCM) 700. For example, the SCM 700 may be associated with a banking application domain. The SCM 700 may be determined based on a pair of datasets (e.g., the first dataset 114A and the second dataset 114B) associated with the banking domain. In an example, the first dataset 114A may be related to a first location or region (e.g., a first country), while the second dataset 114B may be related to a second location or region (e.g., a second country).

The SCM 700 may be a directed acyclic graph representative of variables associated with the first dataset 114A. The directed acyclic graph of the SCM 700 may be indicative of a causal effect of a set of input variables associated with the first dataset 114A on a set of output variables associated with the first dataset 114A. For example, the SCM 700 may include a first node 702A, a second node 702B, and a third node 702C. The first node 702A (denoted by "X") may represent input variables such as, a credit score, an income, and an age associated with individuals in the first dataset 114A associated with the banking domain. The second node 702B (denoted by "Y") may represent output (or outcome) variables such as, a loan decision for individuals in the first dataset 114A. As shown in FIG. 7, the input variables (denoted by "X") may causally affect the output variables (denoted by "Y"), which may be represented in the SCM 700 by a directed edge from the first node 702A to the second node 702B. In an example, the causal effect of X on Y (where X is considered as an input binary random variable and Y as an outcome variable) may be determined as $E(Y|do(X=1))-E(X|do(X=0))$, where $E(.)$ may represent an expectation value and $do(.)$ may represent an intervention (also called a "do-action") to change a value of a variable.

The directed acyclic graph of the SCM 700 may be augmented based on a set of selection variables (denoted by "S") indicative of the determined feature difference information associated with the first dataset 114A and the second dataset 114B. The third node 702C (denoted by "Z") may represent the variables that may correspond to the feature difference between the first dataset 114A and the second dataset 114B. For example, the feature difference (i.e., the set of selection variables) may include a gender variable. The directed acyclic graph of the SCM 700, which may be augmented based on the set of selection variables (denoted by "S") may also be referred as a selection diagram. The set of selection variables (denoted by "S") may be represented as nodes indicated as concentric circles in the selection diagram. A population associated with the first dataset 114A may be switchable to a population associated with the second dataset 114B, based on an application of a set of conditions on different values of at least one of the set of selection variables.

For example, consider "D" as a selection diagram that may characterize two datasets or populations such as, "π" and "π*" and "S" may be the set of selection variables in "D". The strata-specific causal effect P*(y|do(x), z) may be transportable from π to π* if Z "d-separates" Y from S in an X-manipulated version of D, i.e., Z satisfies (Y⊥S|Z, X) Dx'. Herein, Dx' may correspond to a post-intervention graph associated with the selection diagram, in which all incoming arrows into X may be deleted. The "d-separation" between S-nodes (i.e., the set of selection nodes) and the outcome variable Y may be achieved based on an adjustment for a conditioning set T (i.e., the set of conditions). The conditioning set T of variables that satisfies (Y⊥S|T) in Dx' may be referred to as s-admissible (with respect to the causal effect of X on Y), where ⊥ denotes conditional independence. The conditioning set T may be chosen such that the outcome variable Y may be conditionally independent of the set of selection variables S based on the conditioning set T. Thus, the set of conditions may correspond to an s-admissibility (or conditional independence) of the set of selection variables with respect to the causal effect of X on Y.

It should be noted that the SCM 700 of FIG. 7 is for exemplary purposes and should not be construed to limit the scope of the disclosure.

It should be noted that the scenario of loan approval decision associated with a banking domain is presented merely as an exemplary scenario of application of the disclosure and should not be construed to limit the scope of the disclosure. The disclosure may be applicable to various other scenarios, without departure from the scope of the disclosure. For example, the disclosure may be applicable to an autonomous car safety-assessment use case, a credit evaluation use case, a recommendation tools/platforms use case, or a language modelling use case. As an example, in the autonomous car safety-assessment use case, the disclosed electronic device 102 may be used to determine whether a meta-learning model associated with an autonomous car system, which may be developed based on datasets from a first location may be safe to use in a second location. In another example, in the credit evaluation use case, the electronic device 102 may be used to determine whether a meta-learning model associated with a banking domain, which may be trained using datasets in one geographical region may be applicable to other geographical regions. In another example, in the recommendation tools/platforms use case, the electronic device 102 may be used to determine whether a meta-learning model trained to predict product recommendations for users of one demographic or class of people may be applicable across other demographics or classes of people (e.g., minoritized groups of people). In yet another example, in the language modelling use case, the electronic device 102 may be used to mitigate effects of large-scale language models trained using one language (e.g., a primary language, such as, English language) to a use case of another language (e.g., a secondary language, such as, Spanish language).

The disclosed electronic device 102 may be configured to train a meta-learning model based on a causal transportability between datasets. The electronic device 102 may receive the plurality of datasets 114 related to the plurality of application domains. Based on the first user input, the electronic device 102 may determine the feature dependency information associated with the first dataset 114A of the received plurality of datasets 114. Further, based on the second user input and the set of ethical requirements, the electronic device 102 may determine the feature difference information associated with the first dataset 114A and the second dataset 114B of the received plurality of datasets 114. Herein, the second dataset 114B may be different from the first dataset 114A. Examples of the set of ethical requirements may include, but are not limited to, a set of fairness requirements, a set of privacy requirements, or a set of security requirements. The electronic device 102 may determine the set of SCMs 108 associated with the first dataset 114A, based on the determined feature dependency information and the determined feature difference information. Further, the electronic device 102 may determine the set of ethical coefficients associated with the set of ethical requirements, based on an application of the causal transportability model on the determined set of SCMs. Thus, causal effects associated with the plurality of datasets 114 and differences between the various attributes between the plurality of datasets may be captured using SCMs, based on the feature dependency information and the feature difference information. The electronic device 102 may determine the trust score associated with the first dataset 114A, based on the determined set of ethical coefficients. Further, the electronic device 102 may train the meta-learning model 110 associated with the plurality of application domains, based on the plurality of trust scores associated with the plurality of datasets. Herein, the plurality of trust scores may include the determined trust score associated with the first dataset 114A. Thus, a contribution of each dataset towards the training of the meta-learning model 110 may be adapted based on the trust score determined for the dataset. As the trust score may factor-in expert knowledge, the meta-learning model 110 trained based on the plurality of trust scores may incorporate ethical requirements as per an expert user. Further, unwanted consequences of dataset distribution shifts (such as bias) and ethical concerns (such as, privacy and security concerns) may be addressed based on the application of the causal transportability model on the set of SCMs 108.

Typically, conventional systems may require an access to individual datasets to train meta-learning models. The disclosed electronic device 102, on the other hand, may not require an access on the individual datasets and may rely on the feature dependency information and the feature difference information associated with one or more datasets to train the meta-learning model 110. The feature dependency information and the feature difference information may be provided by expert users. The disclosed electronic device 102 may determine the set of SCMs 108 based on the feature dependency information and the feature difference information. Further, the causal transportability model may be applied on the set of SCMs 108 to determine the trust scores associated with the datasets. The meta-learning model 110 may be trained based on the determined trust scores. As the individual dataset may not be directly accessed, the meta-learning model 110, which may be trained using the disclosed electronic device 102, may not be affected from distribution shifts associated with the individual datasets. Further, unlike the conventional systems, the meta-learning model 110, that may be trained using the disclosed electronic device 102, may not be prone to biases and ethical concerns, as the disclosed electronic device 102 may involve human-in-the-loop and may rely on domain-specific knowledge from the expert users. Also, the disclosed electronic device 102 may enable the expert user to provide the confidence levels associated with the feature differences, thereby receiving a propensity of bias of a feature than merely a classification of a feature as a bias or no-bias feature. The disclosed electronic device 102 may further use the confidence levels to determine the trust scores. Further, the meta-learning model 110, that may be trained by the electronic device 102, may be data and model agnostic and may be applicable across a variety of use cases to mitigate the effects of dataset distribution shifts.

Various embodiments of the disclosure may provide one or more non-transitory computer-readable storage media configured to store instructions that, in response to being executed, cause a system (such as, the example electronic device 102) to perform operations. The operations may include receiving a plurality of datasets related to a plurality of application domains. The operations may further include determining feature dependency information associated with a first dataset of the received plurality of datasets, based on a first user input. The operations may further include determining feature difference information associated with the first dataset and a second dataset of the received plurality of datasets, based on a second user input and a set of ethical requirements. Herein, the second dataset may be different from the first dataset. The operation may further include determining a set of structural causal models (SCMs) associated with the first dataset based on the determined feature dependency information and the determined feature difference information. The operations may further include determining a set of ethical coefficients associated with the set of ethical requirements based on an application of a causal transportability model on the determined set of SCMs. The operations may further include determining a trust score associated with the first dataset based on the determined set of ethical coefficients. The operations may further include training a meta-learning model associated with the plurality of application domains, based on a plurality of trust scores associated with the plurality of datasets. Herein, the plurality of trust scores may include the determined trust score associated with the first dataset.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the electronic device 102. In some embodiments, the different components, modules, engines, and services described in the present disclosure may be implemented as objects or processes that execute on the electronic device 102 (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any electronic device 102 as previously defined in the present disclosure, or any module or combination of modulates running on a electronic device 102.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
   receiving a plurality of datasets related to a plurality of application domains;
   determining feature dependency information associated with a first dataset of the plurality of datasets, based on a first user input;
   determining feature difference information associated with the first dataset and a second dataset of the received plurality of datasets, based on a second user input and a set of ethical requirements, the second dataset is different from the first dataset;
   determining a set of structural causal models (SCMs) associated with the first dataset based on the feature dependency information and the determined feature difference information;
   determining a set of ethical coefficients associated with the set of ethical requirements based on an application of a causal transportability model on the set of SCMs;
   determining a trust score associated with the first dataset based on the set of ethical coefficients;
   capturing, by the set of SCMs, causal effects associated with the plurality of datasets and the feature dependency information and the feature difference information between various attributes between the plurality of datasets;
   training a meta-learning model associated with the plurality of application domains, based on a plurality of trust scores associated with the plurality of datasets, the plurality of trust scores includes the trust score associated with the first dataset without requiring access to one or more datasets.

2. The method according to claim 1, wherein the feature dependency information includes at least one of:
   a set of input variables associated with the first dataset,
   a set of output variables associated with the first dataset,
   dependency information associated with the set of input variables and the set of output variables, or
   a confidence level associated with the dependency information.

3. The method according to claim 1, wherein
   the feature difference information corresponds to a population difference between a set of first features associated with the first dataset and a set of second features associated with the second dataset, and
   the set of first features corresponds to the set of second features.

4. The method according to claim 1, wherein the set of ethical requirements includes at least one of: a set of fairness requirements, a set of privacy requirements, or a set of security requirements.

5. The method according to claim 1, wherein
   each of the set of SCMs corresponds to a directed acyclic graph representative of variables associated with the first dataset, and
   the directed acyclic graph is augmented based on a set of selection variables indicative of the feature difference information.

6. The method according to claim 5, wherein a population associated with the first dataset is switchable to a population associated with the second dataset, based on an application of a set of conditions on different values of at least one of the set of selection variables.

7. The method according to claim 5, wherein the directed acyclic graph is indicative of a causal effect of a set of input variables associated with the first dataset on a set of output variables associated with the first dataset.

8. The method according to claim 5, wherein the directed acyclic graph further includes a set of unobserved variables that affect a set of input variables associated with the first dataset.

9. The method according to claim 1, wherein each of the set of ethical coefficients is determined based on a confidence level associated with the feature difference information, and a causal transportability coefficient associated with the first dataset and the second dataset.

10. The method according to claim 9, wherein
    the causal transportability coefficient is determined by use of the causal transportability model, and
    the causal transportability model corresponds to a causal fusion tool.

11. The method according to claim 1, wherein the trust score is determined based on a weighted average of the set of ethical coefficients.

12. The method according to claim 1, wherein the meta-learning model corresponds to a generative learning model including at least one of: a metric-based learning model, an optimization-based learning model, or a model-based learning model.

13. One or more non-transitory computer-readable storage media configured to store instructions that, in response to being executed, cause an electronic device to perform operations comprising:
    receiving a plurality of datasets related to a plurality of application domains;

determining feature dependency information associated with a first dataset of the plurality of datasets, based on a first user input;

determining feature difference information associated with the first dataset and a second dataset of the received plurality of datasets, based on a second user input and a set of ethical requirements, the second dataset is different from the first dataset;

determining a set of structural causal models (SCMs) associated with the first dataset based on the feature dependency information and the feature difference information;

determining a set of ethical coefficients associated with the set of ethical requirements based on an application of a causal transportability model on the set of SCMs;

determining a trust score associated with the first dataset based on the set of ethical coefficients;

capturing, by the set of SCMs, causal effects associated with the plurality of datasets and the feature dependency information and the feature difference information between various attributes between the plurality of datasets;

training a meta-learning model associated with the plurality of application domains, based on a plurality of trust scores associated with the plurality of datasets, the plurality of trust scores includes the trust score associated with the first dataset without requiring access to one or more datasets.

14. The one or more non-transitory computer-readable storage media according to claim 13, wherein the feature dependency information includes at least one of:
    a set of input variables associated with the first dataset,
    a set of output variables associated with the first dataset,
    dependency information associated with the set of input variables and the set of output variables, or
    a confidence level associated with the dependency information.

15. The one or more non-transitory computer-readable storage media according to claim 13, wherein
    the feature difference information corresponds to a population difference between a set of first features associated with the first dataset and a set of second features associated with the second dataset, and
    the set of first features corresponds to the set of second features.

16. The one or more non-transitory computer-readable storage media according to claim 13, wherein the set of ethical requirements includes at least one of: a set of fairness requirements, a set of privacy requirements, or a set of security requirements.

17. The one or more non-transitory computer-readable storage media according to claim 13, wherein
    each of the set of SCMs corresponds to a directed acyclic graph representative of variables associated with the first dataset, and
    the directed acyclic graph is augmented based on a set of selection variables indicative of the feature difference information.

18. The one or more non-transitory computer-readable storage media according to claim 17, wherein a population associated with the first dataset is switchable to a population associated with the second dataset, based on an application of a set of conditions on different values of at least one of the set of selection variables.

19. The one or more non-transitory computer-readable storage media according to claim 13, wherein each of the set of ethical coefficients is determined based on a confidence level associated with the feature difference information, and a causal transportability coefficient associated with the first dataset and the second dataset.

20. An electronic device, comprising:

a memory storing instructions;

a processor, coupled to the memory, that executes the instructions to perform a process comprising:

receiving a plurality of datasets related to a plurality of application domains;

determining feature dependency information associated with a first dataset of the plurality of datasets, based on a first user input;

determining feature difference information associated with the first dataset and a second dataset of the received plurality of datasets, based on a second user input and a set of ethical requirements, the second dataset is different from the first dataset;

determining a set of structural causal models (SCMs) associated with the first dataset based on the feature dependency information and the feature difference information;

determining a set of ethical coefficients associated with the set of ethical requirements based on an application of a causal transportability model on the set of SCMs;

determining a trust score associated with the first dataset based on the set of ethical coefficients;

capturing, by the set of SCMs, causal effects associated with the plurality of datasets and the feature dependency information and the feature difference information between various attributes between the plurality of datasets;

training a meta-learning model associated with the plurality of application domains, based on a plurality of trust scores associated with the plurality of datasets, the plurality of trust scores includes the trust score associated with the first dataset without requiring access to one or more datasets.

* * * * *